US00RE47425E

(19) United States
(12) Reissued Patent
Lim et al.

(10) Patent Number: US RE47,425 E
(45) Date of Reissued Patent: Jun. 4, 2019

(54) LIGHTING DEVICE HAVING REFLECTORS FOR INDIRECT LIGHT EMISSION

(71) Applicant: LG INNOTEK CO., LTD., Seoul (KR)

(72) Inventors: Dong Nyung Lim, Seoul (KR); Tae Young Choi, Seoul (KR); Do Hwan Kim, Seoul (KR); Cheon Joo Kim, Seoul (KR)

(73) Assignee: LG INNOTEK CO., LTD., Seoul (KR)

(21) Appl. No.: 14/721,832

(22) Filed: May 26, 2015

Related U.S. Patent Documents

Reissue of:
(64) Patent No.: 8,680,755
Issued: Mar. 25, 2014
Appl. No.: 13/738,605
Filed: Jan. 10, 2013

(30) Foreign Application Priority Data

May 7, 2012 (KR) ..... 10-2012-0048246
May 24, 2012 (KR) ..... 10-2012-0055593
(Continued)

(51) Int. Cl.
*F21K 9/23* (2016.01)
*F21V 3/06* (2018.01)
(Continued)

(52) U.S. Cl.
CPC ..... *H05B 33/02* (2013.01); *F21K 9/232* (2016.08); *F21V 29/78* (2015.01); *F21K 9/23* (2016.08);
(Continued)

(58) Field of Classification Search
CPC ..... F21Y 2101/00; F21Y 2115/10; F21Y 2101/10
(Continued)

(56) References Cited

U.S. PATENT DOCUMENTS 3,995,149 A * 11/1976 Lukas ..... G03B 15/0484 362/11
6,220,722 B1 * 4/2001 Begemann ..... 362/231
(Continued)

FOREIGN PATENT DOCUMENTS

CN 201568889 U 9/2010
CN 101865372 A 10/2010
(Continued)

OTHER PUBLICATIONS

Korean Office Action dated May 28, 2015 issued in Application No. 10-2015-0012482.
(Continued)

*Primary Examiner* — Anjan K Deb
(74) *Attorney, Agent, or Firm* — Ked & Associates, LLP

(57) ABSTRACT

A lighting device may be provided that includes: a heat sink which includes a base and a member extending from the base; a light source module which is disposed on a lateral surface of the member; and a reflector which is disposed on the member and has a disposition recess exposing the light source module, wherein the at least two light source modules are provided and the light source module includes a terminal plate which electrically connects the at least two light source modules, and wherein the terminal plate is disposed on the reflector.

34 Claims, 9 Drawing Sheets

(30) Foreign Application Priority Data

May 24, 2012 (KR) ..... 10-2012-0055594
May 24, 2012 (KR) ..... 10-2012-0055595

(51) Int. Cl.

| | |
|---|---|
| ***F21K 9/232*** | (2016.01) |
| ***F21K 9/238*** | (2016.01) |
| ***F21V 17/12*** | (2006.01) |
| ***F21V 23/00*** | (2015.01) |
| ***F21V 29/77*** | (2015.01) |
| ***F21V 29/78*** | (2015.01) |
| ***H05B 33/02*** | (2006.01) |
| ***F21Y 107/30*** | (2016.01) |
| ***F21Y 115/10*** | (2016.01) |

(52) U.S. Cl.
CPC ..... *F21K 9/238* (2016.08); *F21V 3/061* (2018.02); *F21V 3/062* (2018.02); *F21V 17/12* (2013.01); *F21V 23/006* (2013.01); *F21V 29/773* (2015.01); *F21Y 2107/30* (2016.08); *F21Y 2115/10* (2016.08)

(58) Field of Classification Search
USPC ..... 362/294, 373, 227, 363; 313/46
See application file for complete search history.

(56) References Cited

U.S. PATENT DOCUMENTS 6,332,690 B1 * 12/2001 Murofushi ..... G02F 1/133305 349/64
6,634,770 B2 10/2003 Cao
6,719,446 B2 * 4/2004 Cao ..... 362/547
7,901,107 B2 * 3/2011 Van De Ven ..... F21K 9/00 257/89
8,227,964 B2 * 7/2012 Choi et al. ..... 313/46
8,227,968 B2 7/2012 Kaandorp et al.
8,511,862 B2 * 8/2013 Ishida ..... F21S 8/08 313/46
8,562,161 B2 * 10/2013 Tong et al. ..... 362/84
8,698,290 B2 4/2014 Masumoto et al.
8,884,508 B2 * 11/2014 Pickard ..... F21V 9/16 313/501
2003/0039119 A1 2/2003 Cao
2006/0193130 A1 8/2006 Ishibashi
2008/0037255 A1 2/2008 Wang
2008/0170396 A1 7/2008 Yuan et al.
2008/0253125 A1 10/2008 Kang et al.
2009/0175041 A1 7/2009 Yuen et al.
2009/0195186 A1 8/2009 Guest et al. ..... 315/294
2009/0316383 A1 * 12/2009 Son ..... F21V 9/10 362/84
2009/0321767 A1 12/2009 Shih et al.
2010/0103666 A1 4/2010 Chang et al.
2010/0188838 A1 * 7/2010 Yajima ..... B60Q 3/0279 362/84
2010/0207502 A1 8/2010 Cao et al.
2010/0207534 A1 * 8/2010 Dowling ..... H05B 33/0818 315/186
2010/0264799 A1 10/2010 Liu et al.
2011/0050070 A1 * 3/2011 Pickard ..... F21V 29/004 313/46
2011/0089830 A1 * 4/2011 Pickard ..... F21K 9/135 315/32
2011/0110096 A1 5/2011 Hong et al.
2011/0156584 A1 6/2011 Kim
2011/0169431 A1 7/2011 Li
2011/0194288 A1 8/2011 Hsu
2011/0215696 A1 9/2011 Tong et al.
2011/0215699 A1 9/2011 Le et al.
2011/0222280 A1 9/2011 Kim
2011/0234078 A1 9/2011 Choi et al.
2011/0248622 A1 10/2011 Wang
2011/0273072 A1 11/2011 Oki
2011/0291542 A1 12/2011 Lu et al.
2011/0299269 A1 12/2011 Hata et al.
2012/0008328 A1 1/2012 Kobayashi et al.
2012/0049732 A1 3/2012 Chuang
2012/0051069 A1 3/2012 Lim
2012/0057327 A1 3/2012 Le et al.
2012/0069545 A1 * 3/2012 Choi et al. ..... 362/84
2012/0127734 A1 5/2012 Tanimoto et al.
2012/0268936 A1 10/2012 Pickard et al.
2012/0275165 A1 * 11/2012 Choi et al. ..... 362/294
2012/0281405 A1 11/2012 Roth et al.
2012/0287636 A1 11/2012 Chen
2012/0326589 A1 * 12/2012 Yu ..... F21K 9/232 313/46
2013/0003346 A1 * 1/2013 Letoquin ..... H05B 33/0803 362/84
2013/0153938 A1 * 6/2013 Grajcar ..... A01K 61/00 257/88
2013/0271972 A1 10/2013 Hussell et al.
2013/0271981 A1 10/2013 Hussell et al.
2014/0043823 A1 2/2014 Liu et al.
2014/0247606 A1 9/2014 Chen et al.
2015/0362168 A1 12/2015 Power et al.
2016/0265728 A1 9/2016 Power et al.

FOREIGN PATENT DOCUMENTS

CN 101922615 A 12/2010
CN 201688160 U 12/2010
CN 102003647 4/2011
CN 102147068 A 8/2011
CN 102270629 A 12/2011
CN 102315370 1/2012
CN 102384452 A 3/2012
CN 102777793 A 11/2012
EP 2 056 014 A2 5/2009
EP 2 239 493 A2 10/2010
EP 2 322 843 A1 5/2011
EP 2 466 194 A1 6/2012
EP 2 469 154 A1 6/2012
EP 2 650 589 A1 10/2013
EP 2 699 843 A1 2/2014
JP 2005-340184 12/2005
JP 2006-244725 9/2006
JP 2007-012288 A 1/2007
JP 2007-048638 A 2/2007
JP 2010-055993 3/2010
JP 2010-055993 A 3/2010
JP 2010-0073337 4/2010
JP 2010-135308 A 6/2010
JP 3163068 U 9/2010
JP 2010-287343 A 12/2010
JP 3164963 U 12/2010
JP 2011-096594 A 5/2011
JP 2011-159637 A 8/2011
JP 2011-165434 A 8/2011
JP 2011-175771 9/2011
JP 3171093 U 10/2011
JP 2011-228300 A 11/2011
JP 2012-038691 2/2012
JP 2012-099375 A 5/2012
JP 2012-181953 9/2012
KR 20-0447540 Y1 2/2010
KR 10-2010-0037353 A 4/2010
KR 10-0955037 B1 4/2010
KR 10-2010-0127447 A 12/2010
KR 10-2011-0050904 A 5/2011
KR 10-2011-0104782 A 9/2011
KR 10-2011-0113544 A 10/2011
KR 10-2011-0117090 A 10/2011
KR 10-1080700 B1 11/2011
KR 10-2011-0133386 A 12/2011
KR 10-2011-0135600 A 12/2011
KR 10-2012-0042846 5/2012
KR 10-2012-0060447 A 6/2012
KR 10-1264213 B1 5/2013
WO WO 00/17569 A1 3/2000
WO WO 2010/038982 A2 4/2010

(56) References Cited

FOREIGN PATENT DOCUMENTS

| | | | |
|---|---|---|---|
| WO | WO 2010/128419 | | 11/2010 |
| WO | 2011/030562 | A1 | 3/2011 |
| WO | WO 2011/087023 | A1 | 7/2011 |
| WO | WO 2011/105030 | A1 | 9/2011 |
| WO | WO 2011/153456 | | 12/2011 |

OTHER PUBLICATIONS

Korean Office Action dated Jun. 17, 2015 issued in Application No. 10-2012-0055594.
Japanese Office Action Feb. 23, 2016 issued in Application No. 2014-528285 (with English translation).
Chinese Office Action dated Dec. 1, 2015 issued in Application No. 201310037557.8 (with English translation).
European Search Report dated Dec. 16, 2015 issued in Application No. 15178494.9.
United States Notice of Allowance dated Jan. 14, 2016 issued in U.S. Appl. No. 14/532,682.
Korean Office Action dated Aug. 23, 2012 issued in Application No. 10-2011-0088970.
International Search Report dated Feb. 8, 2013 issued in Application No. PCT/KR2012/006995.
Korean Office Action dated Apr. 16, 2013 issued in Application No. 10-2011-0140134.
European Search Report dated Jul. 4, 2013 issued in Application No. 13 15 3490.
Korean Notice of Allowance dated Jul. 11, 2013 issued in Application No. 10-2011-0088970.
United States Office Action dated Mar. 7, 2014 issued in U.S. Appl. No. 13/583,752.
European Office Action dated Mar. 21, 2014 issued in Application No. 13 153 490.1.
U.S. Office Action dated Oct. 30, 2014 issued in U.S. Appl. No. 13/754,676.
Korean Search Report dated Feb. 4, 2015 issued in Application No. 10-2015-0012482.
Korean Search Report dated Feb. 6, 2015 issued in Application No. 10-2012-0055594.
European Search Report dated Feb. 26, 2015 issued in Application No. 12 828 129.2.
Chinese Office Action dated Apr. 23, 2015 issued in Application No. 201280042711.4 (English translation only).
U.S. Notice of Allowance dated Apr. 29, 2015 issued in U.S. Appl. No. 13/754,676.
European Search Report dated Jul. 30, 2015 issued in Application No. 15165874.7.
Notice of Allowance dated Nov. 13, 2013 issued in U.S. Appl. No. 13/738,605.
Japanese Office Action dated Jun. 9, 2016 issued in Application No. 2013-017278.
Chinese Office Action dated Jul. 18, 2016 issued in Application No. 201310037557.8.
United States Office Action dated Jan. 27, 2017 issued in U.S. Appl. No. 15/096,992.
Japanese Office Action dated Jan. 10, 2017 issued in Application No. 2013-053707.
Chinese Office Action dated Jan. 17, 2017 issued in Application No. 201310072511.X (with English translation).
Chinese Office Action dated Feb. 24, 2017 issued in Application No. 201310037557.8 (with English translation).
United States Notice of Allowance dated Mar. 27, 2017 issued in U.S. Appl. No. 15/096,992.
Japanese Office Action dated Jun. 5, 2018 issued in Application No. 2017-153785.
Korean Office Action dated Apr. 30, 2018 issued in Application No. 10-2012-0048246.
Korean Office Action dated May 21, 2018 issued in Application No. 10-2012-0055593.
Korean Office Action dated May 21, 2018 issued in Application No. 10-2012-0055595.
Korean Office Action dated Dec. 18, 2018 issued in Application No. 10-2012-0055593.
Korean Office Action dated Dec. 19, 2018 issued in Application No. 10-2012-0055595.
European Search Report dated Apr. 4, 2013 issued in Application No. 13 15 2311.

* cited by examiner

LIGHTING DEVICE HAVING REFLECTORS FOR INDIRECT LIGHT EMISSION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED [APPLICATION] *APPLICATIONS*

[The present] *This* application *is a Reissue Application of prior U.S. Pat. No. 8,680,755 issued Mar. 25, 2014* (*U.S. patent application Ser. No. 13/738,605 filed Jan. 10, 2013*), *which* claims priority under 35 U.S.C. §119(e) of Korean Patent Application No. 10-2012-0048246 filed May 7, 2012, No. 10-2012-0055593 filed May 24, 2012, No. 10-2012-0055594 filed May 24, 2012, No. 10-2012-0055595 filed May 24, 2012, [the subject matters of which] *whose entire disclosures* are incorporated herein by reference.

BACKGROUND

1. Field

The inventions relates to a lighting device.

2. Background

A light emitting diode (LED) is an energy device for converting electric energy into light energy. Compared with an electric bulb, the LED has higher conversion efficiency, lower power consumption and a longer life span. As there advantages are widely known, more and more attentions are now paid to a lighting apparatus using the LED.

The lighting apparatus using the LED are generally classified into a direct lighting apparatus and an indirect lighting apparatus. The direct lighting apparatus emits light emitted from the LED without changing the path of the light. The indirect lighting apparatus emits light emitted from the LED by changing the path of the light through reflecting means and so on. Compared with the direct lighting apparatus, the indirect lighting apparatus mitigates to some degree the intensified light emitted from the LED and protects the eyes of users.

SUMMARY

One embodiment is a lighting device. The lighting device includes: a heat sink which includes a base and a member extending from the base; a light source module which is disposed on a lateral surface of the member; and a reflector which is disposed on the member and has a disposition recess exposing the light source module. The at least two light source modules are provided and the light source module includes a terminal plate which electrically connects the at least two light source modules. The terminal plate is disposed on the reflector.

The reflector may have a shape corresponding to that of the member and wherein the reflector covers the member. The heat sink may comprise a receiver which passes through the base and the member. The reflector may comprise a lower portion having the disposition recess, and an upper portion disposed on the receiver.

The lighting device may further comprises a cover which is disposed on the reflector and is coupled to the heat sink. The upper portion of the reflector may have a surface convex toward the cover. An angle between the lateral surface of the member and a central axis of the lighting device may be equal to or greater than 0.3 degree and equal to or less than 3 degree.

The lateral surface of the member of the heat sink may be curved. The light source module may comprise a flexible substrate disposed on the curved surface and a light emitting diode disposed on the substrate.

The heat radiating fin may comprise an upper portion and a lower portion. A width of the upper portion of the heat radiating fin may increase with the approach to a lower portion of the base from an upper portion of the base. A width of the lower portion of the heat radiating fin may decrease with the approach to the lower portion of the base from the upper portion of the base. The upper portion of the heat radiating fin may be disposed under a light distribution area of light emitted from the light source module and not overlapped with the light distribution area.

A thickness of the heat radiating fin may be equal to or larger than 0.8 mm and is equal to or less than 3.0 mm. On the basis of a vertical axis passing through a center of the light emitting device, a maximum emission angle of the light emitting device may be defined by an angle between the vertical axis and a tangent line passing through both the center of the light emitting device and a contact point of the upper portion of the heat radiating fin. A plurality of the heat radiating fins may be disposed to surround the outer surface of the base of the heat sink and may be separated from each other at a predetermined interval. An interval between the outermost ends of the two adjacent heat radiating fins among the plurality of the heat radiating fins may be different from an interval between the innermost ends of the two adjacent heat radiating fins.

The light source module may comprise a substrate disposed on the lateral surface of the member of the heat sink, and the light emitting device disposed on the substrate. An area of the lateral surface of the member may be greater than that of the bottom surface of the substrate. The substrate may be disposed to lean more on the lower portion of the lateral surface of the member than the upper portion of the lateral surface of the member, so that a portion of the lateral surface of the member is exposed.

A distance from the uppermost portion of the member to the uppermost portion of the substrate may be equal to or greater than 3 mm and is equal to or less than 5 mm. The heat sink may comprise a receiver passing through the base and the member. The member may further comprise an extension part extending toward the receiver.

A length of the extension part may be equal to or greater than 10 mm and be equal to or less than 20 mm on the basis of the lateral surface of the member. A thickness of the member may be equal to or larger than 2.5 mm and be equal to or less than 5 mm.

Another embodiment is a lighting device. The lighting device includes: a heat sink including a base including a heat radiating fin, and a member which extends from the base and has at least one lateral surface; and a light source module disposed on the lateral surface of the member of the heat sink and comprising a light emitting device. The heat radiating fin may include an upper portion and a lower portion. A width of the upper portion of the heat radiating fin may increase with the approach to a lower portion of the base from an upper portion of the base. A width of the lower portion of the heat radiating fin may decrease with the approach to the lower portion of the base from the upper portion of the base. The upper portion of the heat radiating fin may be disposed under a light distribution area of light emitted from the light source module and not overlapped with the light distribution area.

The reflector may have a shape corresponding to that of the member and wherein the reflector covers the member. The heat sink may comprise a receiver which passes through the base and the member. The reflector may comprise a lower portion having the disposition recess, and an upper portion disposed on the receiver.

The lighting device may further comprises a cover which is disposed on the reflector and is coupled to the heat sink. The upper portion of the reflector may have a surface convex toward the cover. An angle between the lateral surface of the member and a central axis of the lighting device may be equal to or greater than 0.3 degree and equal to or less than 3 degree.

The lateral surface of the member of the heat sink may be curved. The light source module may comprise a flexible substrate disposed on the curved surface and a light emitting diode disposed on the substrate.

The heat radiating fin may comprise an upper portion and a lower portion. A width of the upper portion of the heat radiating fin may increase with the approach to a lower portion of the base from an upper portion of the base. A width of the lower portion of the heat radiating fin may decrease with the approach to the lower portion of the base from the upper portion of the base. The upper portion of the heat radiating fin may be disposed under a light distribution area of light emitted from the light source module and not overlapped with the light distribution area.

A thickness of the heat radiating fin may be equal to or larger than 0.8 mm and is equal to or less than 3.0 mm. On the basis of a vertical axis passing through a center of the light emitting device, a maximum emission angle of the light emitting device may be defined by an angle between the vertical axis and a tangent line passing through both the center of the light emitting device and a contact point of the upper portion of the heat radiating fin. A plurality of the heat radiating fins may be disposed to surround the outer surface of the base of the heat sink and may be separated from each other at a predetermined interval. An interval between the outermost ends of the two adjacent heat radiating fins among the plurality of the heat radiating fins may be different from an interval between the innermost ends of the two adjacent heat radiating fins.

The light source module may comprise a substrate disposed on the lateral surface of the member of the heat sink, and the light emitting device disposed on the substrate. An area of the lateral surface of the member may be greater than that of the bottom surface of the substrate. The substrate may be disposed to lean more on the lower portion of the lateral surface of the member than the upper portion of the lateral surface of the member, so that a portion of the lateral surface of the member is exposed.

A distance from the uppermost portion of the member to the uppermost portion of the substrate may be equal to or greater than 3 mm and is equal to or less than 5 mm. The heat sink may comprise a receiver passing through the base and the member. The member may further comprise an extension part extending toward the receiver.

A length of the extension part may be equal to or greater than 10 mm and be equal to or less than 20 mm on the basis of the lateral surface of the member. A thickness of the member may be equal to or larger than 2.5 mm and be equal to or less than 5 mm.

Further another embodiment is a lighting device. The lighting device includes: a heat sink including a base and a member disposed on the base; a light source module disposed on the member of the heat sink; a housing which is disposed in the base of the heat sink and inside the member of the heat sink and is formed of a material having electrical insulation; and a power supply which is received inside the housing and supplies electrical power to the light source module. The housing includes an upper housing and a lower housing. The upper housing is surrounded by the member of the heat sink. The lower housing is surrounded by the base of the heat sink. The upper housing receives an upper portion of the power supply, and wherein the lower housing receives the rest portion of the power supply.

The heat sink may comprise a receiver which passes through the base and the member, the receiver of the heat sink may be a through-hole. The through-hole may have a shape corresponding to that of the housing.

The through-hole may comprise an upper portion defined by the member of the heat sink, and a lower portion defined by the base of the heat sink. A space volume of the upper portion of the through-hole may be different from that of the lower portion of the through-hole. The lower housing may comprise a molding part for fixing the power supply.

The reflector may have a shape corresponding to that of the member and wherein the reflector covers the member. The heat sink may comprise a receiver which passes through the base and the member. The reflector may comprise a lower portion having the disposition recess, and an upper portion disposed on the receiver.

The lighting device may further comprise a cover which is disposed on the reflector and is coupled to the heat sink. The upper portion of the reflector may have a surface convex toward the cover. An angle between the lateral surface of the member and a central axis of the lighting device may be equal to or greater than 0.3 degree and equal to or less than 3 degree.

The lateral surface of the member of the heat sink may be curved. The light source module may comprise a flexible substrate disposed on the curved surface and a light emitting diode disposed on the substrate.

The heat radiating fin may comprise an upper portion and a lower portion. A width of the upper portion of the heat radiating fin may increase with the approach to a lower portion of the base from an upper portion of the base. A width of the lower portion of the heat radiating fin may decrease with the approach to the lower portion of the base from the upper portion of the base. The upper portion of the heat radiating fin may be disposed under a light distribution area of light emitted from the light source module and not overlapped with the light distribution area.

A thickness of the heat radiating fin may be equal to or larger than 0.8 mm and is equal to or less than 3.0 mm. On the basis of a vertical axis passing through a center of the light emitting device, a maximum emission angle of the light emitting device may be defined by an angle between the vertical axis and a tangent line passing through both the center of the light emitting device and a contact point of the upper portion of the heat radiating fin. A plurality of the heat radiating fins may be disposed to surround the outer surface of the base of the heat sink and may be separated from each other at a predetermined interval. An interval between the outermost ends of the two adjacent heat radiating fins among the plurality of the heat radiating fins may be different from an interval between the innermost ends of the two adjacent heat radiating fins.

The light source module may comprise a substrate disposed on the lateral surface of the member of the heat sink, and the light emitting device disposed on the substrate. An area of the lateral surface of the member may be greater than that of the bottom surface of the substrate. The substrate may be disposed to lean more on the lower portion of the lateral surface of the member than the upper portion of the lateral surface of the member, so that a portion of the lateral surface of the member is exposed.

A distance from the uppermost portion of the member to the uppermost portion of the substrate may be equal to or greater than 3 mm and is equal to or less than 5 mm. The heat sink may comprise a receiver passing through the base and the member. The member may further comprise an extension part extending toward the receiver.

A length of the extension part may be equal to or greater than 10 mm and be equal to or less than 20 mm on the basis of the lateral surface of the member. A thickness of the member may be equal to or larger than 2.5 mm and be equal to or less than 5 mm.

A portion of the cover and a portion of the heat sink may have a shape suitable to couple the cover to the heat sink.

The lighting device according to the invention is capable of performing optimum omni-directional light distribution.

The lighting device according to the invention is capable of enhancing heat radiation performance.

The lighting device according to the invention is capable of blocking electrical contact between a light source module and a heat sink.

The lighting device according to the invention is capable of removing a dark portion which may be generated in a cover.

The lighting device according to the invention has good workability in assemblage or manufacture.

The lighting device according to the invention is capable of improving light-extraction efficiency.

BRIEF DESCRIPTION OF THE DRAWINGS

Arrangements and embodiments may be described in detail with reference to the following drawings in which like reference numerals refer to like elements and wherein.

DETAILED DESCRIPTION

The invention will be now disclosed making reference to the enclosed drawings and disclosing more than one embodiment. A skilled in this art will easily understand that the invention is not limited to a single embodiment but that some features and functional characteristics may be in common to the various embodiments so that some of the inventive features of different embodiments may even be merged and combined even if not explicitly reported in the corresponding description.

A thickness or a size of each layer may be magnified, omitted or schematically shown for the purpose of convenience and clearness of description. The size of each component may not necessarily mean its actual size.

It should be understood that when an element is referred to as being 'on' or "under" another element, it may be directly on/under the element, and/or one or more intervening elements may also be present. When an element is referred to as being 'on' or 'under', 'under the element' as well as 'on the element' may be included based on the element.

An embodiment may be described in detail with reference to the accompanying drawings.

Figure 1:
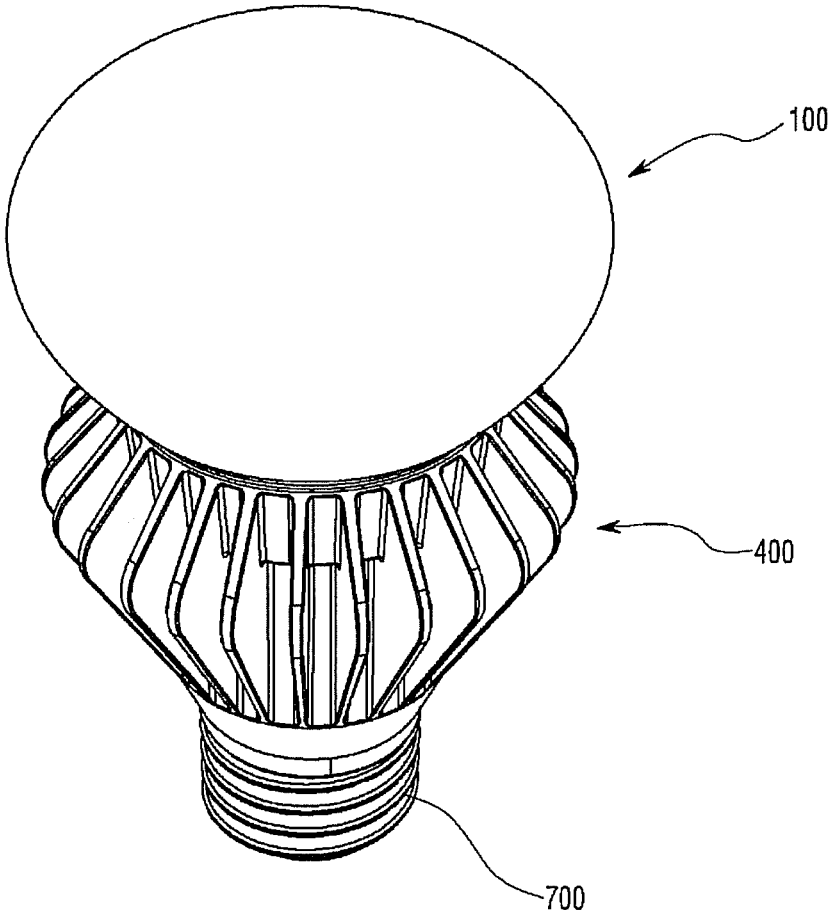
FIG. 1 is a top perspective view of a lighting device according to an embodiment.
Figure 2:
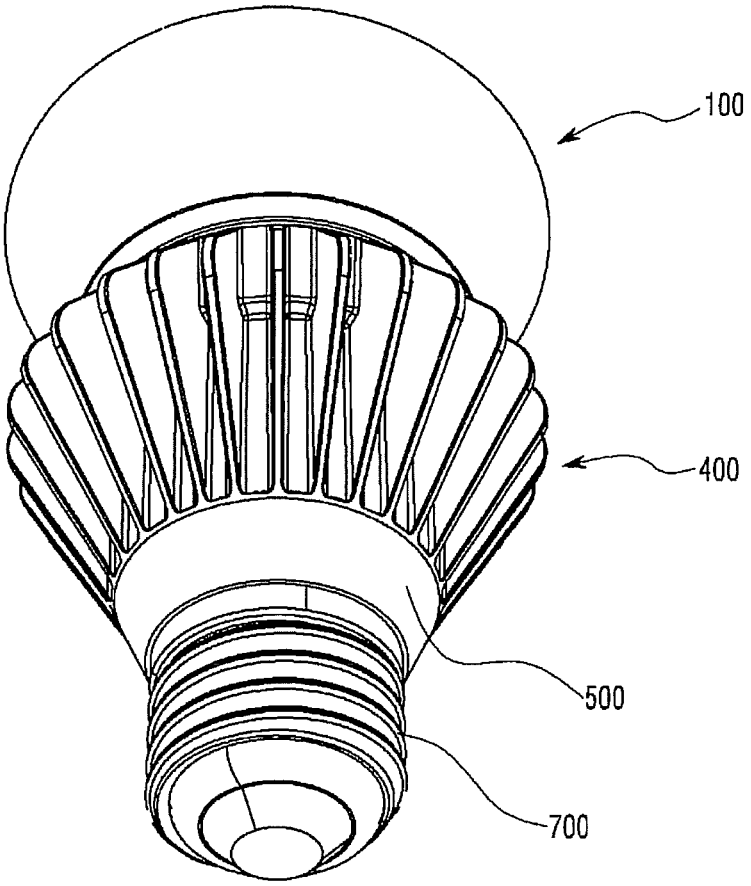
FIG. 2 is a bottom perspective view of the lighting device shown in FIG. 1.
Figure 3:
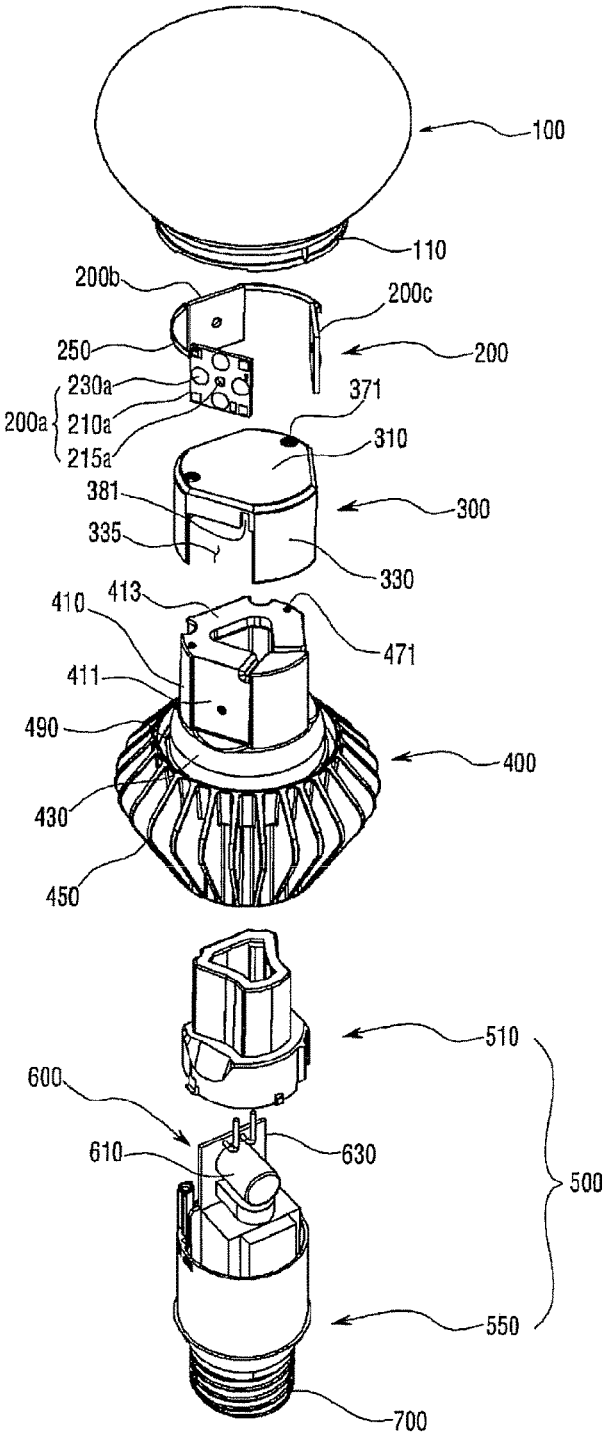
FIG. 3 is an exploded perspective view of the lighting device shown in FIG. 1.
Figure 4:
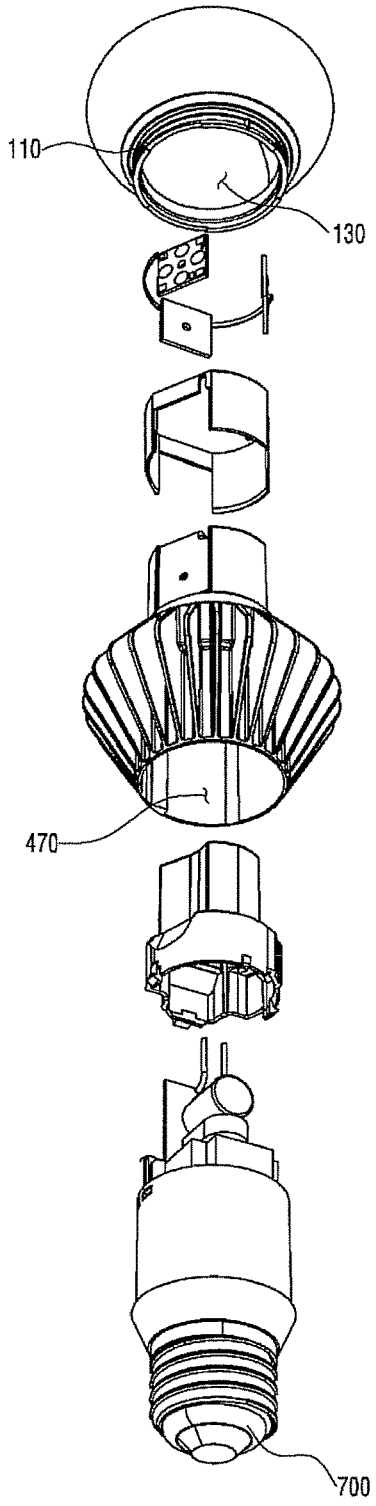
FIG. 4 is an exploded perspective view of the lighting device shown in FIG. 2.
Figure 5:
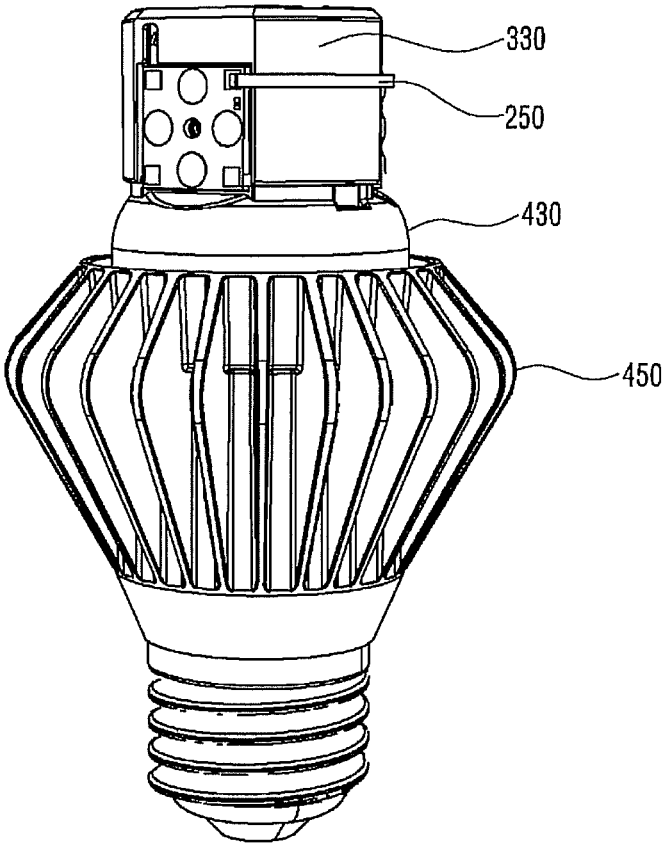
FIG. 5 is a front view showing that the lighting device shown in FIG. 1 does not include a cover.
Figure 6:
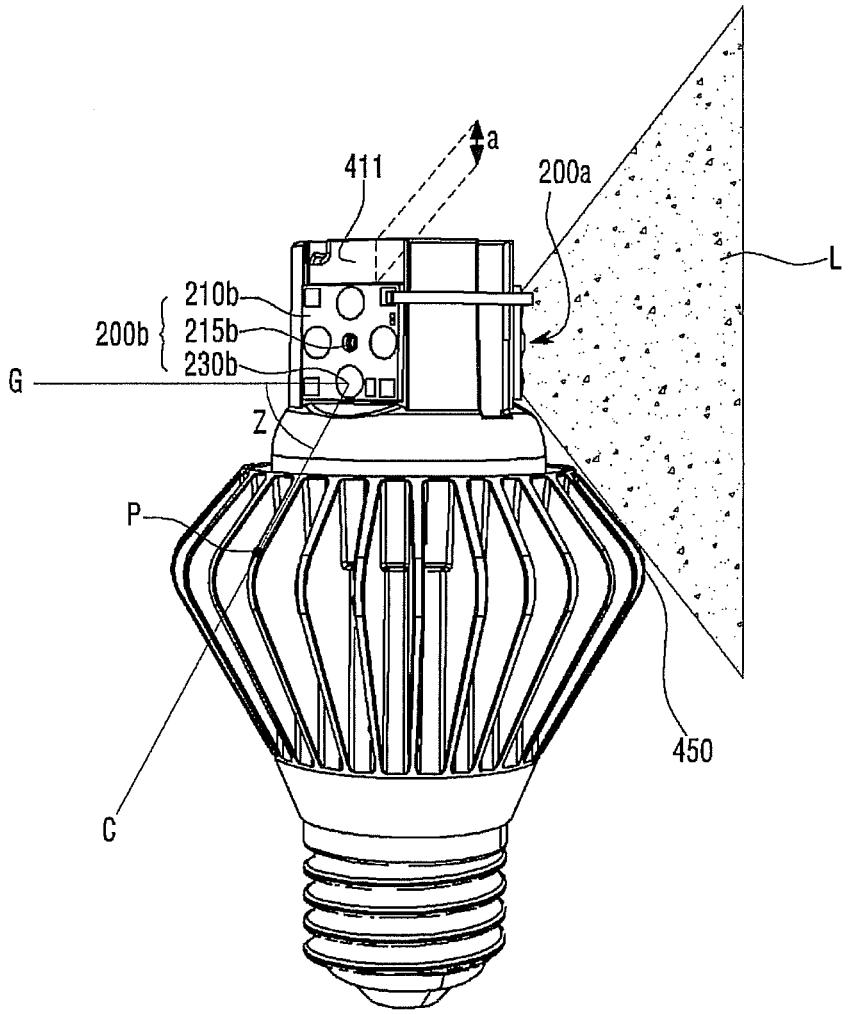
FIG. 6 is a front view showing that the lighting device shown in FIG. 1 does not include a cover and a reflector.

FIG. 1 is a top perspective view of a lighting device according to an embodiment. FIG. 2 is a bottom perspective view of the lighting device shown in FIG. 1. FIG. 3 is an exploded perspective view of the lighting device shown in FIG. 1. FIG. 4 is an exploded perspective view of the lighting device shown in FIG. 2. FIG. 5 is a front view showing that the lighting device shown in FIG. 1 does not include a cover. FIG. 6 is a front view showing that the lighting device shown in FIG. 1 does not include a cover and a reflector.

Referring to FIGS. 1 to 6, the lighting device according to the embodiment may include a cover 100, a light source module 200, a reflector 300, a heat sink 400, a housing 500, a power supply 600 and a socket 700. Hereafter, the components will be described in detail respectively.

<Cover 100>

The cover 100 has a bulb shape with an empty interior. The cover 100 also has a partial opening 130 of which a portion has been opened.

The cover 100 is optically connected to the light source module 200. For example, the cover 100 may diffuse, scatter or excite light emitted from the light source module 200.

The cover 100 is coupled to the heat sink 400. For this, a portion of the cover 100 and a portion of the heat sink 400 may have a shape suitable to couple the cover 100 to the heat sink 400. For example, the cover 100 may include a coupler 110. The coupler 110 may be inserted into a coupling recess 490 of the heat sink 400. The coupler 110 may have a screw thread-shaped coupling structure. A screw recess-shaped structure corresponding to the screw thread-shaped coupling structure is formed in the coupling recess 490, thereby making it easier for the cover 100 and the heat sink 400 to be coupled to each other. Therefore, workability can be enhanced.

The thickness of the cover 100 may have a value within a range between 1 mm and 2 mm.

The cover 100 may be made of a light diffusing polycarbonate (PC) for the purpose of prevent a user from feeling glare caused by the light emitted from the light source module 200. Further, the cover 100 may be made of any one of glass, plastic, polypropylene (PP) and polyethylene (PE).

The inner surface of the cover 100 may be anti-corrosion treated. Moreover, a predetermined pattern may be applied to the outer surface of the cover 100. With this feature the light emitted from the light source module 200 can be scattered. Accordingly, the user is able to avoid the glare.

The cover 100 may be manufactured by a blow molding process for the sake of uniform light distribution of omni-directional light. In the blow molding process, the diameter of the opening 130 of the cover 100 may be from 3 mm to 20 mm.

Embossing pattern may be formed on the surface of the cover 100. Preferably, the embossing pattern may be formed on the surface of the cover 100 close to the partial opening 130. This structure can improve the scatter of light.

In a modified embodiment, the cover 100 may include a plurality of protrusions (un-drawn). The heat sink 400 may have a plurality of recesses whose position corresponding to those of the plurality of protrusions of the cover 100. The plurality of protrusions may be shaped suitable to be inserted and locked into the plurality of recesses of the heat sink 400. For example, the tips of the protrusions may be trapezoidal so that the protrusions can be locked in the recesses of the heat sink 400. Due to the structure, workability can be enhanced.

<Light Source Module 200>

The light source module 200 emits a predetermined light.

A plurality of the light source modules 200 may be provided. Specifically, the light source module 200 may include a first light source module 200a, a second light source module 200b and a third light source module 200c.

The first to the third light source modules 200a, 200b and 200c may respectively include a substrate 210a and a light emitting device 230a disposed on the substrate 210a.

The substrate 210a may be formed by printing a circuit pattern on an insulator. For example, the substrate 210a may include a general printed circuit board (PCB), a metal core PCB, a flexible PCB, a ceramic PCB and the like. The surface of the substrate 210a may be formed of a material capable of efficiently reflecting light. The surface of the substrate 210a may be coated with a color capable of efficiently reflecting light, for example, white, silver and the like.

A predetermined hole 215a may be formed in the center of the substrate 210a. The hole 215a may be a reference point for arranging the light emitting devices 230a. A screw may be inserted into the hole 215a in order to fix the substrate 210a to the heat sink 400. The screw can serve as a thermal path, so the heat transfer from the substrate 210a to the heat sink 400 can improve.

At least one light emitting device 230a may be disposed on one side of the substrate 210a. In FIG. 3, a plurality of the light emitting devices 230a may be disposed on one side of the substrate 210a. The light emitting device 230a may be a light emitting diode chip emitting red, green and blue light or a light emitting diode chip emitting ultraviolet light. Here, the light emitting diode chip may have a lateral type or a vertical type and may emit blue, red, yellow or green light.

A lens may be disposed on the light emitting device 230a. The lens is disposed to cover the light emitting device 230a. The lens is able to adjust an emission angle or a direction of light emitted from the light emitting device 230a. The lens may be a hemispherical shape and may be made of a light transmitting resin like silicone resin or epoxy resin without an empty space. The light transmitting resin may wholly or partially include a distributed fluorescent material.

When the light emitting device 230a is a blue light emitting diode, the fluorescent material included in the light transmitting resin may include at least one selected from a group consisting of a garnet material (YAG, TAG), a silicate material, a nitride material and an oxynitride material.

Though natural light (white light) can be created by allowing the light transmitting resin to include only yellow fluorescent material, the light transmitting resin may further include a green fluorescent material or a red fluorescent material in order to improve a color rendering index and to reduce a color temperature.

When the light transmitting resin is mixed with many kinds of fluorescent materials, an addition ratio of the color of the fluorescent material may be formed such that the green fluorescent material is more used than the red fluorescent material, and the yellow fluorescent material is more used than the green fluorescent material. The garnet material, the silicate material and the oxynitride material may be used as the yellow fluorescent material. The silicate material and the oxynitride material may be used as the green fluorescent material. The nitride material may be used as the red fluorescent material. The light transmitting resin may be mixed with various kinds of the fluorescent materials or may be configured by a layer including the red fluorescent material, a layer including the green fluorescent material and a layer including the yellow fluorescent material, which are formed separately from each other.

The light source module 200 may include a terminal plate 250. The first to the third light source modules 200a, 200b and 200c may be electrically connected to each other by means of the terminal plate 250. For example, the first to the third light source modules 200a, 200b and 200c may be electrically connected in series to each other through use of the two terminal plates 250.

The terminal plate 250 may be made of a conductive metallic material. For instance, the terminal plate 250 may be made by using any one of copper, nickel and zinc plating or the compound comprising at least two selected from copper, nickel and zinc plating. For the purpose of manufacturing the light source module 200, the terminal plate 250 may be made of a metallic material which is easily bent. By using the terminal plate 250, the workability for installing the light source module 200 in the heat sink 400 can be improved and the light source modules are more stably connected to each other than they are connected by using a wire.

Preferably, the thickness of the terminal plate 250 may be from 0.1 mm to 0.5 mm. If the thickness is less than 0.1 mm, the terminal plate 250 would be easily snapped in the manufacturing process or by an external shock. If the thickness is more than 0.5 mm, the terminal plate 250 can be difficult to bend.

The light source module 200 is disposed in the heat sink 400. Specifically, the substrates 210a of the first to the third light source modules 200a, 200b and 200c may be disposed on an outer lateral surface 411 of a member 410 of the heat sink 400. The laterally arranged light source modules 200a, 200b, and 200c can improve the performance of omni-directional light by scattering the light uniformly throughout the cover 100.

<Reflector 300>

The reflector 300 is coupled to the heat sink 400. Specifically, the reflector 300 may be coupled to the member 410 of the heat sink 400.

The reflector 300 has a shape corresponding to that of the member 410 of the heat sink 400. Also, the reflector 300 may have a shape covering the member 410 of the heat sink 400. Specifically, the reflector 300 may include an upper portion 310 and a lower portion 330. The upper portion 310 is disposed on the top surface of the member 410 of the heat sink 400. The lower portion 330 is disposed on the lateral surface of the member 410 of the heat sink 400. In other words, the lower portion 330 may extend from the periphery of the upper portion 310 along the lateral surface of the member 410. The upper portion 310 may be substantially perpendicular to the lower portion 330.

The upper portion 310 of the reflector 300 may include a flat surface or a surface convex toward the cover 100. When the upper portion 310 of the reflector 300 includes the convex surface, there is an advantage of reducing dark portions which may be generated in the uppermost portion of the cover 100.

The reflector 300 may have a coupling means suitable to be coupled to the heat sink 400, and the heat sink 400 may have a corresponding coupling means. For example, the upper portion 310 of the reflector 300 may have at least one hole 371, and the top surface of the member 410 of the heat sink 400 may have at least one hole 471 at the corresponding position of the holes of the upper portion 310 of the reflector 300. Both holes can be fastened by a fastening means, such as screw. But, the coupling means of the reflector 300 and the heat sink 400 is not limited thereto.

The minimum distance from the upper portion 310 of the reflector 300 to the uppermost portion of the cover 100 may be equal to or greater than 15 mm. If the distance from the upper portion 310 of the reflector 300 to the inner surface of the cover 100 is less than and not equal to 15 mm, the dark portion may be generated in the uppermost portion of the cover 100. When the minimum distance from the upper portion 310 of the reflector 300 to the inner surface of the cover 100 is equal to or greater than 15 mm, the dark portion can be remarkably reduced and density of the dark portion can be more reduced.

The reflector 300 may have a disposition recess 335. The disposition recess 335 may be formed in the lower portion 330 of the reflector 300. The light source module 200 disposed in the member 410 of the heat sink 400 may be disposed in the disposition recess 335. Specifically, the substrate 210a of the light source module 200 may be disposed in the disposition recess 335. While the reflector 300 is disposed on the member 410 of the heat sink 400, the disposition recess 335 prevents the reflector 300 from being disposed on the light source module 200.

The reflector 300 may be made of white polycarbonate (PC) which easily reflects the light emitted from the light source module 200 and has thermal resistance. The reflector 300 is able to raise light-extraction efficiency of the lighting device according to the embodiment.

The reflector 300 may be made of a material having electrical insulation. The reflector 300 may be disposed between the member 410 of the heat sink 400 and the terminal plate 250 of the light source module 200. Such a reflector 400 is able to block electrical contact between the terminal plate 250 and the heat sink 400.

A surface treatment process is performed on the surface of the reflector 300, so that the light from the light source module 200 is scattered and a user is able to avoid the glare.

The side surfaces of the substrates 210a of the light source module 200a may be arranged in parallel to the inner side of the disposition recess 335. At least one side surfaces of the substrates 210a may contact with the inner side of the disposition recess 335 when they are assembled.

The lower portion 330 of the reflector 300 may have a guide 381 through which the light source modules 200 are provided electric power from the power supply 600. The guide 381 may be a recess extended from the disposition recess 335 of the reflector 300. Alternatively, the guide 381 may be a hole formed on the surface between the disposition recess 335 and the upper portion 310 of the reflector 300.

<Heat Sink 400>

The light source module 200 is disposed on the heat sink 400. The heat sink 400 receives heat from the light source module 200 and radiates the heat. The heat sink 400 is coupled to the cover 100 and receives the power supply 600 and the housing 500.

Figure 7:
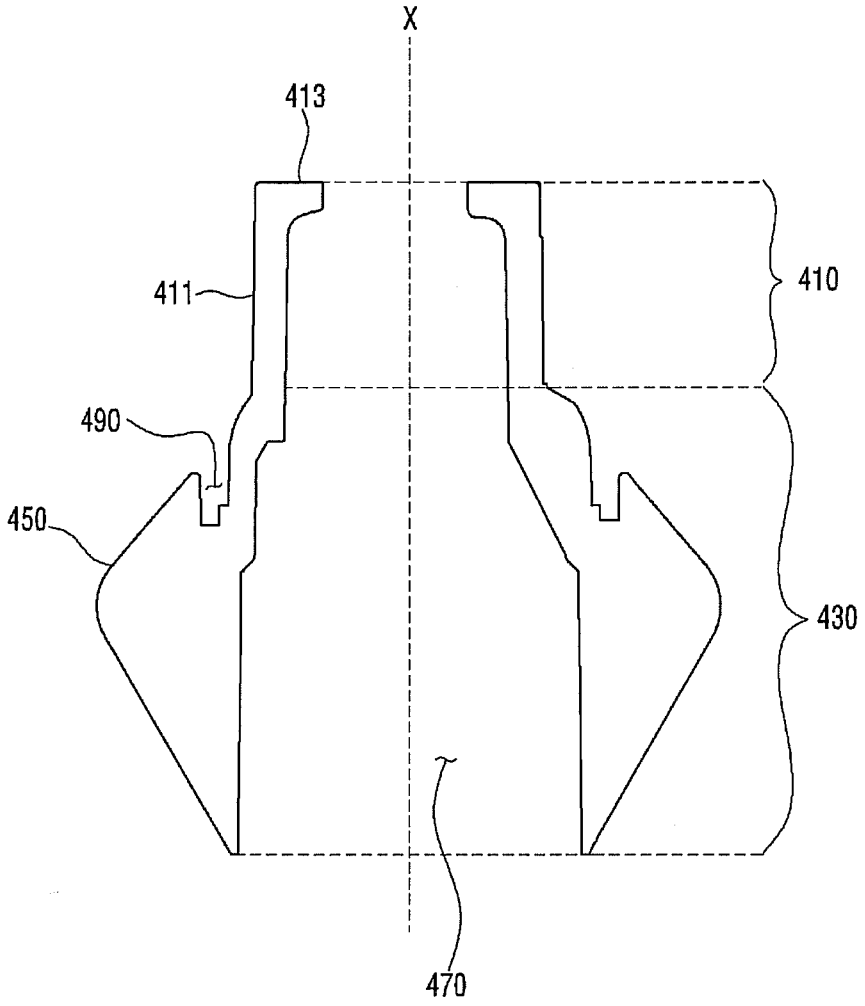
FIG. 7 is a cross sectional view of a heat sink alone shown in FIG. 2.

FIG. 7 is a cross sectional view of the heat sink alone shown in FIG. 2.

Referring to FIGS. 1 to 7, the heat sink 400 may include the member 410, a base 430 and a heat radiating fin 450.

The member 410 may extend upward from the upper portion of the base 430. The member 410 may be integrally formed with the base 430 or may be formed separately from the base 430 and bonded or coupled to the base 430.

The member 410 may have a cylindrical shape. The light source module 200 is disposed on the outer surface of the cylindrical member 410.

The member 410 has the lateral surface 411 on which the light source module 200 is disposed. The member 410 has the lateral surface 411 of which the number is the same as the number of the light source modules 200. For example, the member 410 may have three lateral surfaces 411 on which the first to the third light source modules 200a, 200b and 200c are disposed respectively. The three lateral surfaces 411 may come in surface contact with the bottom surfaces of the substrates 210a of the first to the third light source modules 200a, 200b and 200c. For this purpose, the three lateral surfaces 411 may be flat. However, there is no limit to this. The three lateral surfaces 411 may be curved. In this case, the substrates 210a may be flexible substrates.

The lateral surface 411 may be, as shown in FIG. 7, substantially parallel with a central axis "X" of the lighting device according to the embodiment. Here, an angle between the lateral surface 411 and the central axis "X" may be from 0.3 degree to 3 degree. If the angle between the lateral surface 411 and the central axis "X" is from 0 degree to 0.3 degree, front light distribution characteristic is deteriorated. That is to say, a dark spot may be generated at the topmost portion of the cover 100. If the angle between the lateral surface 411 and the central axis "X" is greater than 3 degree, omni-directional distribution characteristic is deteriorated.

The area of the lateral surface 411 is, as shown in FIG. 6, greater than that of the bottom surface of the substrate 210a and is disposed to lean on the lower portion of the lateral surface 411 instead of the central portion of the lateral surface 411. Therefore, the substrate 210a is not disposed on the upper portion of the lateral surface 411. When the lateral surface 411 includes a portion on which the substrate 210a is not disposed, heat generated from the light source module 200 is transferred from the member 410 not only to the base 430 but also the upper portion of the member 410. Accordingly, the temperature of the light source module 200 can be rapidly reduced. As a result, it is possible to improve heat radiation performance of the lighting device according to the embodiment.

Here, a distance "a" from the uppermost portion of the lateral surface 411 to the uppermost portion of the substrate 210a may be from 3 mm to 5 mm. If the distance "a" is less than 3 mm, remarkable heat radiation effect is not obtained. If the distance "a" is greater than 5 mm, the dark portion generated in the uppermost portion of the cover 100 becomes thicker.

The thickness of the member 410 may be from 2.5 mm to 5 mm. If the thickness of the member 410 is less than 2.5 mm, heat radiation performance is degraded. If the thickness of the member 410 is greater than 5 mm, the material cost of the heat sink 400 is increased and an interior space for receiving the power supply 600 is reduced.

The member 410 may include an extension part 413. The extension part 413 may extend from the uppermost portion of the member 410 toward a receiver 470. Since the heat generated from the light source module 200 may be transferred more to the upper portion of the member 410 by the extension part 413 and the heat transferred to the extension part 413 can cause heat convection in the receiver 470, the temperature of the light source module 200 can be rapidly reduced. Therefore, it is possible to improve heat radiation performance of the lighting device according to the embodiment. Here, the length of the extension part 413 may be from 10 mm to 20 mm on the basis of the lateral surface 411. The extension part 413 having a length less than 10 mm has no great influence on heat radiation performance improvement. The extension part 413 having a length greater than 20 mm does not allow the power supply 600 and the light source module 200 to be easily connected to each other.

In a modified embodiment, the extension part 413 may be formed separately from the uppermost portion of the member 410 and bonded or coupled to the uppermost portion of the member 410.

The base 430 is disposed under the member 410. The base 430 and the member 410 may be integrally formed with each other.

A plurality of the heat radiating fins 450 may be disposed on the outer surface of the base 430. The plurality of the heat radiating fins 450 may project outward from the outer surface of the base 430. The base 430 and the plurality of the heat radiating fins 450 may be integrally formed with each other or may be formed separately from each other and coupled to each other.

The heat radiating fin 450 may have an upper portion and a lower portion. The width of the upper portion of the heat radiating fin 450 increases with the approach to the lower portion of the base 430 from the upper portion of the base 430. The width of the upper portion can be defined, for example, as the distance from a point of the heat radiating fin 450 located near the receiver 470 to a point on the outer periphery of the hear radiating fin 450 where the hypothetical line connecting the two points is substantially perpendicular to the outer surface of the base 430. When the width of the upper portion of the heat radiating fin 450 increases with the approach to the lower portion of the base 430 from the upper portion of the base 430, the omni-directional distribution characteristic of the lighting device according to the embodiment can be enhanced. This is because the light emitted from the light source module 200 is not blocked by the upper portion of the heat radiating fin 450. This will be described in more detail with reference to FIG. 6. To describe the structure in a different way, each of the heat radiating fin 450 has a triangular shape where first vertex of the triangle is located near one portion of the body close to the member 410, second vertex of the triangle is located near the opposite portion of the body close to the housing 550, and the third vertex of the triangle protrudes outward from the receiver 470.

Referring to FIG. 6, the upper portion of the heat radiating fin 450 may be formed in consideration of the light emitted from the light source module 200a. Specifically, the upper portion of the heat radiating fin 450 may be formed in consideration of a light distribution area "L" of the light emitted from the light source module 200a. In other words, the upper portion of the heat radiating fin 450 may be disposed under the light distribution area "L" of the light source module 200a, or the upper portion of the heat radiating fin 450 may be disposed in such a manner as not to be overlapped with the light distribution area "L" of the light source module 200a.

The emission angle of the light source module 200b and the upper portion of the heat sink 400 may have the following relation. On the basis of a vertical axis "G" passing through the center of a light emitting device 230b, the maximum emission angle "Z" of the light emitting device 230b may be defined by an angle between the vertical axis "G" and a tangent line "C" passing through both the center of the light emitting device 230b and a contact point of the upper portion of the heat radiating fin 450. When the maximum emission angle "Z" of the light emitting device 230b is defined in this manner, the omni-directional light distribution characteristic of the lighting device according to the embodiment can be enhanced. Here, the maximum emission angle "Z" may be from 50 degree to 80 degree. If the maximum emission angle "Z" is less than 50 degree, omni-directional light distribution meeting a standard specification cannot be obtained. If the maximum emission angle "Z" is greater than 80 degree, it is not possible to obtain a sufficient area for radiating the heat.

In the definition of the maximum emission angle "Z" of the light emitting device 230b, the vertical axis "G" may pass through the center of a substrate 210b instead of the center of the light emitting device 230b. In other words, the vertical axis "G" may pass through a hole 215b of the substrate 210b.

Figure 8:
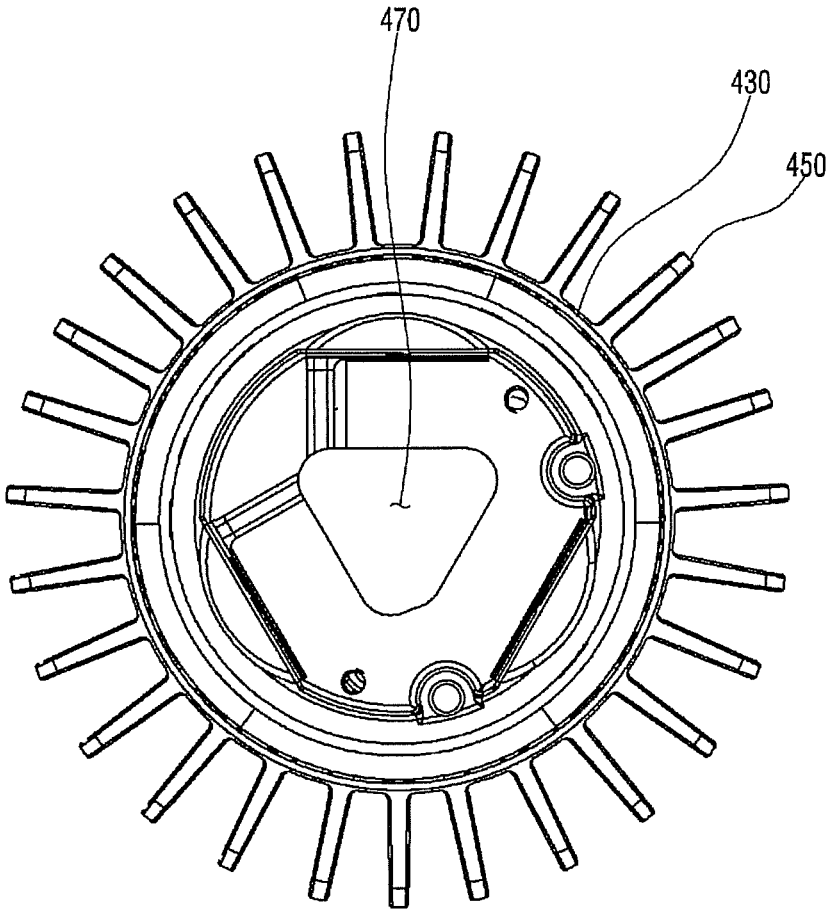
FIG. 8 is a plan view of the heat sink shown in FIG. 2.

FIG. 8 is a plan view of the heat sink 400 shown in FIG. 2.

Referring to FIG. 8, the heat radiating fin 450 may project perpendicularly to the outer surface of the base 430.

The heat radiating fin 450 may become thinner from the outer surface of the base 430 to the outside. The thickness of the heat radiating fin 450 may be from 0.8 mm to 3.0 mm. If the thickness of the heat radiating fin 450 is less than 0.8 mm, the heat radiating fin 450 is difficult to be formed and an expected heat radiation effect cannot be obtained. If the thickness of the heat radiating fin 450 is larger than 3.0 mm, an interval between two adjacent heat radiating fins is reduced, so that when the heat sink 400 is powder-coated, a desired coating process cannot be performed between the two adjacent heat radiating fins.

The plurality of the heat radiating fins 450 may be separated from each other at a predetermined interval. Here, an interval between the outermost ends of the two heat radiating fins 450 may be from 6 mm to 7 mm, and an interval between the innermost ends of the two heat radiating fins 450 may be from 4 mm to 6 mm. When the interval between the outermost ends of the heat radiating fins 450 is different from the interval between the innermost ends of the heat radiating fins 450, heat radiation performance can be improved and a powder coating process can be performed with ease to the innermost end of the heat radiating fin 450.

The heat sink 400 has a receiver 470 for receiving the housing 500 thereinside. The receiver 470 may be a through-hole passing through the member 410 and the base 430 of the heat sink 400. The through-hole 470 may be defined by a portion surrounded by the member 410 and a portion surrounded by the base 430. The upper portion of the through-hole 470 is surrounded by the member 410. The lower portion of the through-hole 470 is surrounded by the base 430. The shape of the upper portion of the through-hole 470 is different from the shape of the lower portion of the through-hole 470. Specifically, the upper portion of the through-hole 470 may have a volume less than that of the lower portion of the through-hole 470. When the volume of the upper portion of the through-hole 470 is less than that of the lower portion of the through-hole 470, even after the housing 500 is received in the through-hole 470 of the heat sink 400, the housing 500 cannot fall into the upper portion of the through-hole 470, which is surrounded by the member 410. Moreover, there is an advantage of improving the assemblability of the lighting device according to the embodiment.

The heat sink 400 may be formed of a metallic material or a resin material which has excellent heat radiation efficiency. The heat sink 400 may be formed of a material having high thermal conductivity (generally, greater than 150 $Wm^{-1}K^{-1}$, and more preferably, greater than 200 $Wm^{-1}K^{-1}$), for example, copper (thermal conductivity of about 400 $Wm^{-1}K^{-}{}_{1}$), aluminum (thermal conductivity of about 250 $Wm^{-1}K^{-1}$), anodized aluminum, aluminum alloy and magnesium alloy. Also, the heat sink 400 may be formed of a metal loaded plastic material like polymer, for example, epoxy or thermally conductive ceramic material (e.g., aluminum silicon carbide (AlSiC) (thermal conductivity of about 170 to 200 $Wm^{-1}K^{-}$).

In a modified embodiment, at least one heat radiating fin 450 may have a different measure from other heat radiating fin 450. Particularly, the heat radiating fin 450 having different measure may have an additional area protruding toward the cover 100. The additional area is shaped such that the cover 100 can be coupled to the heat sink 400. Preferably, the number of the at least one heat radiating fin 450 may be three, and the three heat radiating fin 450 may be uniformly arranged on the circumference of the heat sink 400. In other words, the distance between each of the three heat radiating fin 450 may be approximately identical.

<Housing 500>

Figure 9:
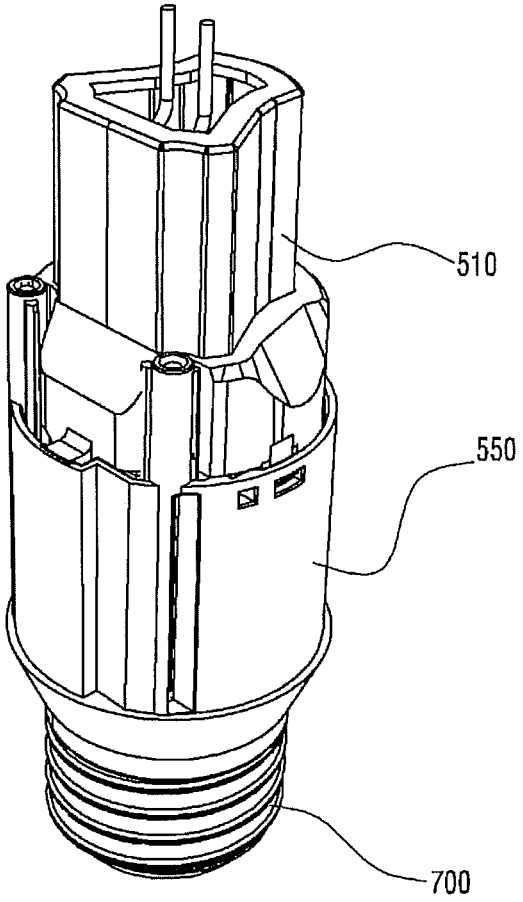
FIG. 9 is a perspective view of a housing alone shown in FIG. 2.

FIG. 9 is a perspective view of the housing alone shown in FIG. 2.

Referring to FIGS. 1 to 9, the housing 500 is disposed within the heat sink 400. Specifically, the housing 500 may be disposed in the receiver 470 of the heat sink 400.

The housing 500 has an appearance corresponding to that of the receiver 470 of the heat sink 400. The inside of the housing 500 has a space for receiving the power supply 600.

The housing 500 receives the power supply 600 thereinside and protects the power supply 600. The housing 500 prevents the heat radiated from the heat sink 400 from being transferred to the power supply 600, thereby preventing the temperature rise of many parts 610 of the power supply 600.

The housing 500 may include an upper housing 510 and a lower housing 550. The upper housing 510 and the lower housing 550 are coupled to each other and may receive the power supply 600 thereinside.

The upper housing 510 is disposed between the member 410 of the heat sink 400 and the upper portion of the power supply 600. Since the upper housing 510 is disposed behind the light source module 200 which generates the most heat in the heat sink 400, the amount of the temperature rise of the parts 610 of the power supply 600 can be reduced.

The lower housing 550 is disposed between the base 430 of the heat sink 400 and the lower portion of the power supply 600. Here, a silicone molding process may be performed on the inside of the lower housing 550 in order to fix the lower portion of the power supply 600. The lower housing 550 may be coupled to the socket 700 to which an external electric power is applied.

The housing 500 may be formed of a material having excellent electrical insulation and thermal resistance. For example, the housing 500 may be formed of polycarbonate (PC).

<Power Supply 600>

Referring to FIG. 3, the power supply 600 may include a support plate 630 and many parts 610 mounted on the support plate 630. The many parts 610 may include, for example, a DC converter converting AC power supply supplied by an external power supply into DC power supply, a driving chip controlling the driving of the light source module 200, an electrostatic discharge (ESD) protective device for protecting the light source module 200, and the like. However, there is no limit to this.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting device comprising:

a heat sink which comprises a base and a member extending from the base;

a light source module which is disposed on a lateral surface of the member; [and]

a reflector which is disposed on *a top surface of* the member and [has a disposition recess exposing the light source module],

*a light transmission enclosure coupled to the base and covering the member, the light source module and the reflector* wherein the at least two light source modules are provided, and the light source module [comprises] *includes* a terminal plate which electrically connects the at least two light source modules, and wherein the terminal plate is disposed [on] *over* the [reflector] *lateral surface of the member*.

2. The lighting device of claim 1, wherein the reflector has a shape corresponding to that of the member and wherein the reflector covers the member.

3. The lighting device of claim 1, wherein the heat sink comprises a receiver which passes through the base and the member, and wherein the reflector comprises a lower portion having the disposition recess, and an upper portion disposed on the receiver.

4. The lighting device of claim 3, [further comprising a cover which is disposed on the reflector and is coupled to the heat sink,] wherein the upper portion of the reflector has a surface convex toward the [cover] *light transmission closure*.

5. The lighting device of claim 4, wherein a minimum distance from the upper portion of the reflector to the [cover] *light transmission enclosure* is equal to or greater than 15 mm.

6. The lighting device of claim 1, wherein an angle between the lateral surface of the member and a central axis of the lighting device is equal to or greater than 0.3 degree and equal to or less than 3 degree.

7. The lighting device of claim 1, wherein the lateral surface of the member is curved and wherein the light source module comprises a flexible substrate disposed on the curved surface and a light emitting diode disposed on the substrate.

8. A lighting device comprising:

a heat sink comprising a base including a heat radiating fin, and a member which extends from the base and has at least one lateral surface; [and]

a light source module disposed on the lateral surface of the member of the heat sink and comprising a light emitting device[.];

*a reflector which is disposed on a top surface of the member; and*

*a light transmission enclosure coupled to base, and covering the member, the light source and the reflector;* wherein the heat radiating fin comprises an upper portion and a lower portion, wherein a width of the upper portion of the heat radiating fin increases with the approach to a lower portion of the base from an upper portion of the base, wherein a width of the lower portion of the heat radiating fin decreases with the approach to the lower portion of the base from the upper portion of the base, and wherein the upper portion of the heat radiating fin is disposed under a light distribution area of light emitted from the light source module and is not overlapped with the light distribution area.

9. The lighting device of claim 8, wherein a thickness of the heat radiating fin is equal to or larger than 0.8 mm and is equal to or less than 3.0 mm.

10. The lighting device of claim 8, wherein on the basis of a vertical axis passing through a center of the light emitting device, a maximum emission angle of the light emitting device is defined by an angle between the vertical axis and a tangent line passing through both the center of the light emitting device and a contact point of the upper portion of the heat radiating fin.

11. The lighting device of claim 8, wherein a plurality of the heat radiating fins are disposed to surround the outer surface of the base of the heat sink and are separated from each other at a predetermined interval, and wherein an interval between the outermost ends of the two adjacent heat radiating fins among the plurality of the heat radiating fins is different from an interval between the innermost ends of the two adjacent heat radiating fins.

12. The lighting device of claim 8, wherein the light source module comprises a substrate disposed on the lateral surface of the member of the heat sink, and the light emitting device disposed on the substrate, wherein an area of the lateral surface of the member is greater than that of the bottom surface of the substrate, and wherein the substrate is disposed to lean more on the lower portion of the lateral surface of the member than the upper portion of the lateral surface of the member, so that a portion of the lateral surface of the member is exposed.

13. The lighting device of claim 12, wherein a distance from the uppermost portion of the member to the uppermost portion of the substrate is equal to or greater than 3 mm and is equal to or less than 5 mm.

14. The lighting device of claim 12, wherein the heat sink comprises a receiver passing through the base and the member and wherein the member further comprises an extension part extending toward the receiver.

15. The lighting device of claim 14, wherein a length of the extension part is equal to or greater than 10 mm and is equal to or less than 20 mm on the basis of the lateral surface of the member.

16. The lighting device of claim 12, wherein a thickness of the member is equal to or larger than 2.5 mm and is equal to or less than 5 mm.

17. A lighting device comprising:

a heat sink comprising a base and a member disposed on the base;

a light source module disposed on *a lateral surface of* the member of the heat sink;

*a light transmission enclosure coupled to base, and covering the member and the light source module;* a housing which is disposed in the base of the heat sink [and inside the member of the heat sink] and is formed of a material having electrical insulation; and a power supply which is received inside the housing *and the member,* and supplies electrical power to the light source module, wherein the housing comprises [an upper housing and] a lower housing, [wherein the upper housing is surrounded by the member of the heat sink,] wherein the lower housing is surrounded by the base of the heat sink,

[wherein the upper housing receives an upper portion of the power supply,] and wherein the lower housing receives [the rest] *a lower* portion of the power supply.

18. The lighting device of claim 17, wherein the heat sink comprises a receiver which passes through the base and the member, wherein the receiver of the heat sink is a through-hole, and wherein the through-hole has a shape corresponding to that of the housing.

19. The lighting device of claim 18, wherein the through-hole comprises an upper portion defined by the member of the heat sink, and a lower portion defined by the base of the heat sink, and wherein a space volume of the upper portion of the through-hole is different from that of the lower portion of the through-hole.

20. The lighting device of claim 17, wherein the lower housing comprises a molding part for fixing the power supply.

*21. A lamp, comprising:*

*an optically transmissive enclosure defining a hollow interior;*

*a heat sink including an extension having a plurality of walls extending in a first direction into the hollow interior, the plurality of walls forming a through hole extending from a lower end of the extension to an upper end of the extension;*

*a plurality of first light emitting devices provided over a first wall of the plurality of walls;*

*a connector configured to receive electric power from an external power source;*

*a power circuitry extending in the first direction, wherein the power circuitry extends into the through hole from the lower end of the extension;*

*a base in which the power circuitry is provided;*

*wherein the optically transmissive enclosure transmits a light from the plurality of the first light emitting devices.*

*22. The lamp of claim 21 further comprises a cover to cover the upper end of the extension.*

*23. The lamp of claim 22, wherein the cover is a reflector.*

*24. The lamp of claim 23, wherein the reflector includes at least one sidewall extending over at least one wall of the extension.*

*25. The lamp of claim 21, wherein the power circuitry includes a plate, the plate extending into the through hole.*

*26. The lamp of claim 25, wherein the plate includes at least one lead, the at least one lead extending into the through hole.*

*27. The lamp of claim 21, wherein the plurality of first light emitting devices is provided on a first substrate, the first substrate provided on the first wall such that the first light emitting devices faces the hollow interior.*

*28. The lamp of claim 27, further comprising a plurality of second light emitting devices provided over a second wall of the plurality of walls.*

*29. The lamp of claim 28, wherein the plurality of second light emitting devices is provided on a second substrate, the second substrate provided on the second wall such that the second light emitting devices faces the hollow interior.*

*30. The lamp of claim 29, wherein the first and second substrates are coupled to each other.*

*31. The lamp of claim 21, wherein the heat sink further includes a heat sink body beneath the lower end of the extension, the heat sink body having a plurality of heat radiating fins provided on an outer circumference of the heat sink body, wherein the through hole extends through the heat sink body.*

*32. The lamp of claim 21, wherein the connector is a cap configured to be screwed into a socket.*

*33. The lamp of claim 21, wherein the plurality of walls faces a second direction, which is perpendicular to the first direction.*

*34. The lamp of claim 21, wherein the optically transmissive enclosure is a bulb shaped enclosure.*

* * * * *